US009058819B2

(12) United States Patent
Mankaruse et al.

(10) Patent No.: US 9,058,819 B2
(45) Date of Patent: Jun. 16, 2015

(54) SYSTEM AND METHOD FOR REDUCING UPLINK NOISE

(75) Inventors: George Mankaruse, Kitchener (CA); Chad Seguin, Waterloo (CA); Sean Simmons, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1832 days.

(21) Appl. No.: 11/563,074

(22) Filed: Nov. 24, 2006

(65) Prior Publication Data

US 2008/0123872 A1 May 29, 2008

(51) Int. Cl.
*H04M 9/00* (2006.01)
*G10L 21/0208* (2013.01)

(52) U.S. Cl.
CPC .................................. *G10L 21/0208* (2013.01)

(58) Field of Classification Search
USPC ........ 379/392.01, 387.01–397, 22.08, 112.03
See application file for complete search history.

(56) References Cited

U.S. PATENT DOCUMENTS

| | | | | |
|---|---|---|---|---|
| 5,550,924 | A * | 8/1996 | Helf et al. | 381/94.3 |
| 6,317,117 | B1 * | 11/2001 | Goff | 345/156 |
| 6,351,532 | B1 * | 2/2002 | Takada et al. | 379/406.01 |
| 6,810,273 | B1 | 10/2004 | Mattila et al. | |
| 7,035,797 | B2 | 4/2006 | Iso-Sipila | |
| 2004/0247110 | A1 | 12/2004 | Harvey et al. | |
| 2005/0100173 | A1 * | 5/2005 | Eid et al. | 381/86 |
| 2005/0119882 | A1 | 6/2005 | Bou-Ghazale | |
| 2005/0246170 | A1 | 11/2005 | Vignoli et al. | |
| 2005/0278172 | A1 | 12/2005 | Koishida et al. | |
| 2006/0126859 | A1 | 6/2006 | Elberling | |

FOREIGN PATENT DOCUMENTS

| | | | | |
|---|---|---|---|---|
| CA | 2611222 | C | 12/2011 | |
| CN | 1719517 | A | 1/2006 | |
| CN | 101222235 | B | 7/2012 | |
| EP | 1282978 | B1 | 10/2005 | |
| EP | 1926085 | B1 | 11/2010 | |
| WO | 95/02288 | A1 | 1/1995 | |
| WO | WO 95/02288 | * | 1/1995 | H04B 15/00 |
| WO | 0189184 | | 11/2001 | |
| WO | 2004068467 | A1 | 8/2004 | |

OTHER PUBLICATIONS

European Examination Report. Application No. 06124725.0. Dated: Nov. 25, 2008.

(Continued)

*Primary Examiner* — Yosef K Laekemariam
(74) *Attorney, Agent, or Firm* — Perry + Currier, Inc.

(57) ABSTRACT

A system and method for reducing uplink noise in a mobile communications device, the system including: a noise estimator for estimating noise in proximity to the mobile communication device; an adjustable filter for receiving a signal from a microphone of the mobile communication device; an adjustable attenuation block for receiving a filtered signal from the adjustable filter; a controller configured to: monitor the estimated noise; and adjust the adjustable filter and adjustable attenuation block based on the estimated noise. In particular, the controller may be configured to adjust the adjustable filter by increasing the depth of the filtering for higher estimated noise levels and adjust the attenuation by increasing the attenuation for higher estimated noise levels.

20 Claims, 11 Drawing Sheets

(56) References Cited

OTHER PUBLICATIONS

European Patent Office, Extended European Search Report, May 9, 2007, EP Application No. 06124725.0-2411.
Sang-Mun Chi et al., Lombard Effect Compensation and Noise Suppresion for Noisy Lombard Speech Recognition, (date: unknown) Department of Computer Science, Korea Advanced Institute of Science and Technology.
Canadian Office Action, Canadian Patent Application No. 2,611,222, dated Mar. 8, 2010.
European Communication of Intention to Grant, European Patent Application No. 06124725.0, dated Apr. 15, 2010.
Chinese Office Action, Chinese Patent Application No. 200710193677.1, dated Aug. 9, 2010.
Canadian Notice of Allowance, Canadian Patent Application No. 2,611,222, dated Mar. 28, 2011.
Chinese Office Action, Chinese Patent Application No. 200710193677.1, dated Dec. 9, 2011.
Response filed to First Examination Report, Indian Patent Application No. 2422/DEL/2007, dated Jul. 16, 2013.
First Examination Report, Indian Patent Application No. 2422/DEL/2007, dated Mar. 28, 2013.
Document relating to SG Application No. 200718055-7, dated Jul. 15, 2010 (Certificate of Grant).
Document relating to CN Application No. 200710193677.1, dated Jul. 4, 2012 (Certificate of Inventive Patent).
Document relating to EP Application No. 06124725.0, dated Nov. 3, 2010 (Certificate of Grant).
Document relating to EP Application No. 06124725.0, dated Oct. 7, 2010 (Decision to Grant).
Document relating to EP Application No. 06124725.0, dated Mar. 17, 2009 (Reply to Exam Report).
Document relating to EP Application No. 06124725.0, dated Nov. 23, 2007 (Reply to Search/Exam Report).

* cited by examiner

System Parameters

| Parameter | Value | Notes |
|---|---|---|
| Adjustable filter cut-off frequency | 1200 Hz | |
| Adjustable filter min attenuation | 0 dB | |
| Adjustable filter max attenuation | 9 dB | |
| Adjustable filter SNR-to-attenuation gain | 1.5 | Gain reduction of 1.5 dB for each1 dB increase of noise level |
| Adjustable filter SNR to attenuation offset | 62dBa | |
| Adjustable gain block min attenuation | 0 dB | |
| Adjustable gain block max attenuation | 3 dB | |
| Adjustable gain block SNR-to-attenuation gain | 0.5 | Gain reduction of 0.5 dB for each 1 dB increase of noise level |
| Adjustable gain block SNR-to-attenuation offset | 70 dBa | |

FIG. 8

SYSTEM AND METHOD FOR REDUCING UPLINK NOISE

FIELD

This application relates to noise reduction and in particular, to a system and method for reducing uplink noise on a communication device in a noisy environment, such as in a vehicle.

BACKGROUND

Mobile communication devices are in use throughout everyday life. One common aspect to the use of mobile communication devices is that they are often used in noisy environments. In particular, mobile communication devices are often used in vehicle cabins, such as cars, trains, airplanes, and the like, which tend to have a considerable amount of low level background noise.

As such, there has been a lot of money and effort devoted to developing systems and methods for reducing noise in communication signals that are generated in a noisy environment. These systems and methods have ranged from very simple filtering to very complex digital signal processing algorithms. The more complex algorithms often involve breaking a signal into various frames and performing various computations on each of the frames to try to remove noise from each frame, and thus, from the signal. Unfortunately, the more simple methods typically do not remove enough noise or cause the voice signal to be less intelligible while the more complex methods are typically more computationally intensive and require greater processing power and processing time to produce the adjusted signal, often with unpredictable effects on the removal of noise from the signal.

There remains a need for an efficient and relatively simple (i.e. less computationally intensive) system and method for reducing uplink noise on a communication signal.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

FIG. 8 is a table listing the parameters for one embodiment of the system of FIG. 5;

DETAILED DESCRIPTION

Figure 1:
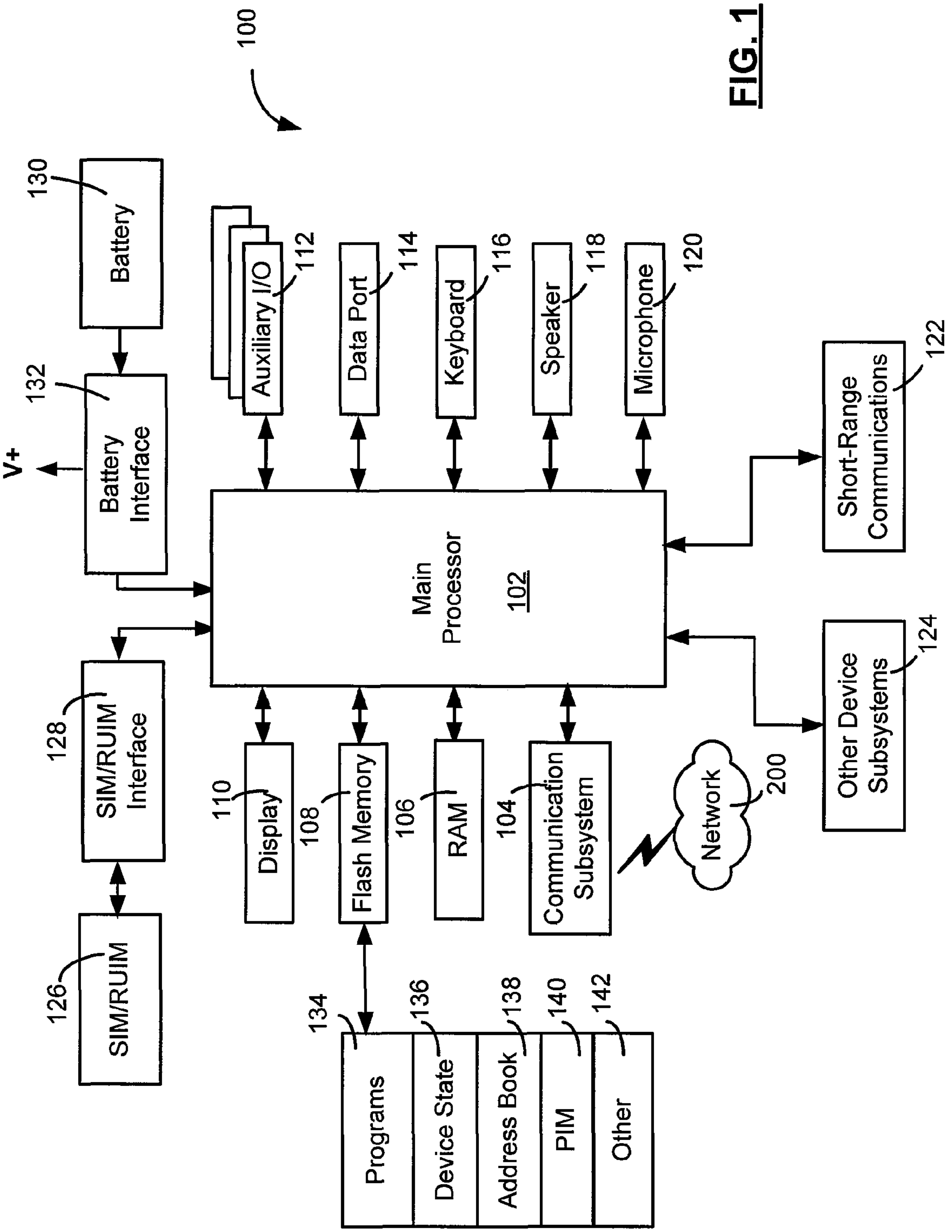
FIG. 1 is a block diagram of an exemplary embodiment of a mobile communication device.

According to one aspect of the embodiments described herein, there is provided a method for reducing uplink noise in a communications device, the method including: receiving an input signal at the communications device; estimating a noise level in the vicinity of the communications device; filtering the input signal based on the estimated noise level; and applying attenuation to the filtered signal based on the estimated noise level.

In a particular case, the filtering based on the estimated noise level may include shelf filtering.

In another particular case, the filtering based on the estimated noise level may include increasing the depth of the filtering for higher estimated noise levels.

In yet another particular case, the filtering based on the estimated noise level may include filtering according to a predetermined function. In this case, the predetermined function may include applying a filter of 0 dB prior to a first threshold of estimated noise level, increasing filtering in a straight-line manner, and applying a predetermined level of filtering after a second threshold of estimated noise level. More particularly, the first threshold may be approximately 62 dBA and the second threshold may be approximately 71 dBA.

In yet another particular case, the applying attenuation based on the estimated noise level may include increasing the attenuation for higher estimated noise levels. More generally, the applying attenuation based on the estimated noise level may include applying attenuation according to a predetermined function. For example, the predetermined function may include applying attenuation of 0 dB prior to a first threshold of estimated noise level, increasing attenuation in a straight-line manner, and applying a predetermined attenuation after a second threshold of estimated noise level. Further, the first threshold may be approximately 70 dBA and the second threshold may be approximately 76 dBA.

According to another aspect, there is provided a system for reducing uplink noise in a mobile communications device, the system including: a noise estimator for estimating noise in proximity to the mobile communication device; an adjustable filter for receiving a signal from a microphone of the mobile communication device; an adjustable attenuation block for receiving a filtered signal from the adjustable filter; a controller configured to: monitor the estimated noise; and adjust the adjustable filter and adjustable attenuation block based on the estimated noise.

In a particular case, the adjustable filter may include a shelf filter.

In another particular case, the controller may be configured to adjust each of the adjustable filter and the adjustable attenuation block based on a predetermined function of the estimated noise.

In yet another particular case, the controller may be configured to adjust the adjustable filter by increasing the depth of the filtering for higher estimated noise levels. In this case, the predetermined function for the adjustable filter may include adjusting the adjustable filter following a first threshold of estimated noise, increasing filtering in a straight-line manner, and applying a predetermined attenuation after a second threshold of estimated noise. Further, the first threshold may be approximately 62 dBA and the second threshold may be approximately 71 dBA.

In yet another particular case, the controller is configured to adjust the attenuation by increasing the attenuation for higher estimated noise levels. In this case, the predetermined function for the adjustable attenuation block may include adjusting the attenuation following a first threshold of estimated noise, increasing attenuation in a straight-line manner, and applying a predetermined attenuation after a second threshold of estimated noise. Further, the first threshold may be approximately 70 dBA and the second threshold may be approximately 76 dBA.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods procedures and components have not been described in detail so as not to obscure the embodiments described herein. Furthermore, this description is not to be considered as limiting the scope of the embodiments described herein in any way, but rather as merely describing the implementation of the various embodiments described herein.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the mobile device 100 perform communication-related functions, whereas other subsystems can provide “resident” or on-device functions, By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional “smart card” that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124, This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary 1/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio 1/O subsystems, such as a voice message recording subsystem can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
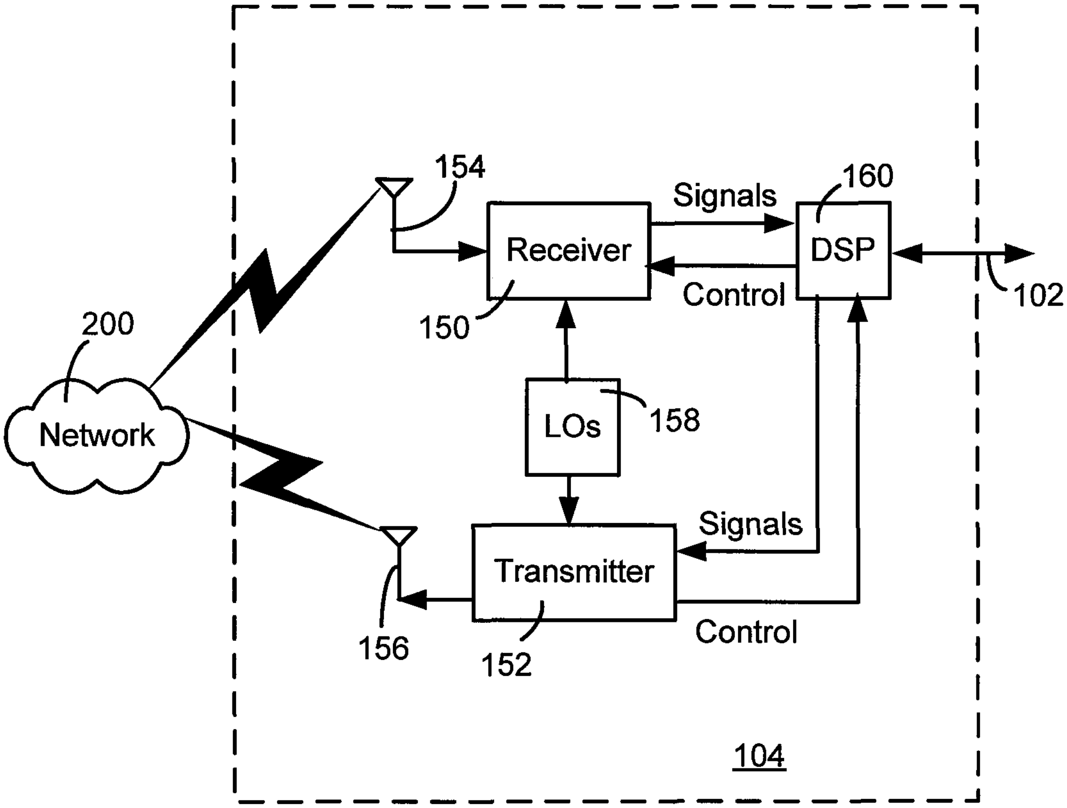
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. AND conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gain/attenuation applied to communication signals in the receiver 150 and transmitter 152 can be adaptively controlled through automatic gain/attenuation control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
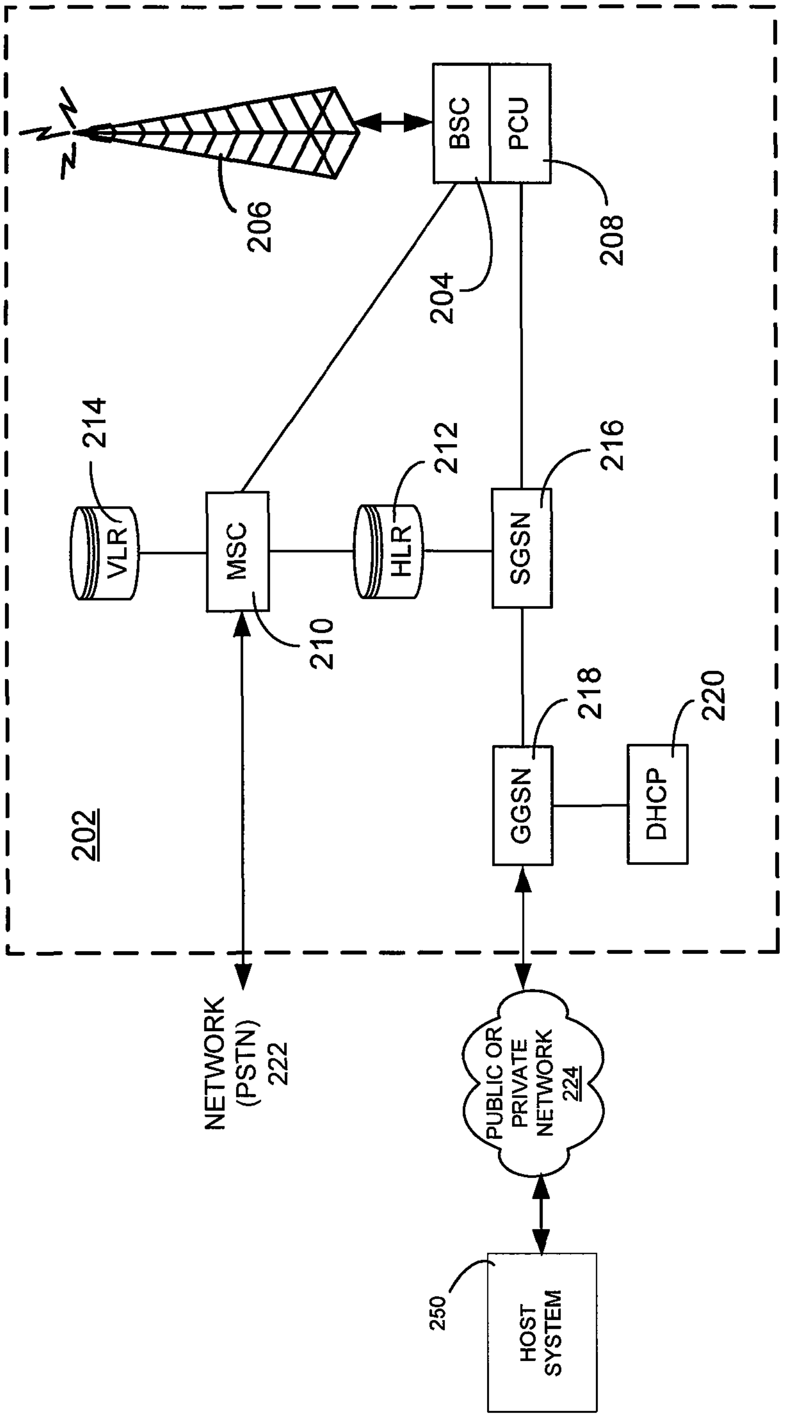

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212 a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Using the above described general mobile device environment as an exemplary environment for communications, an exemplary embodiment of a system and method for reducing uplink noise will be described. It will be understood that the system and method for reducing uplink noise may also be used in other communications systems that are used in noisy environments.

Figure 4:
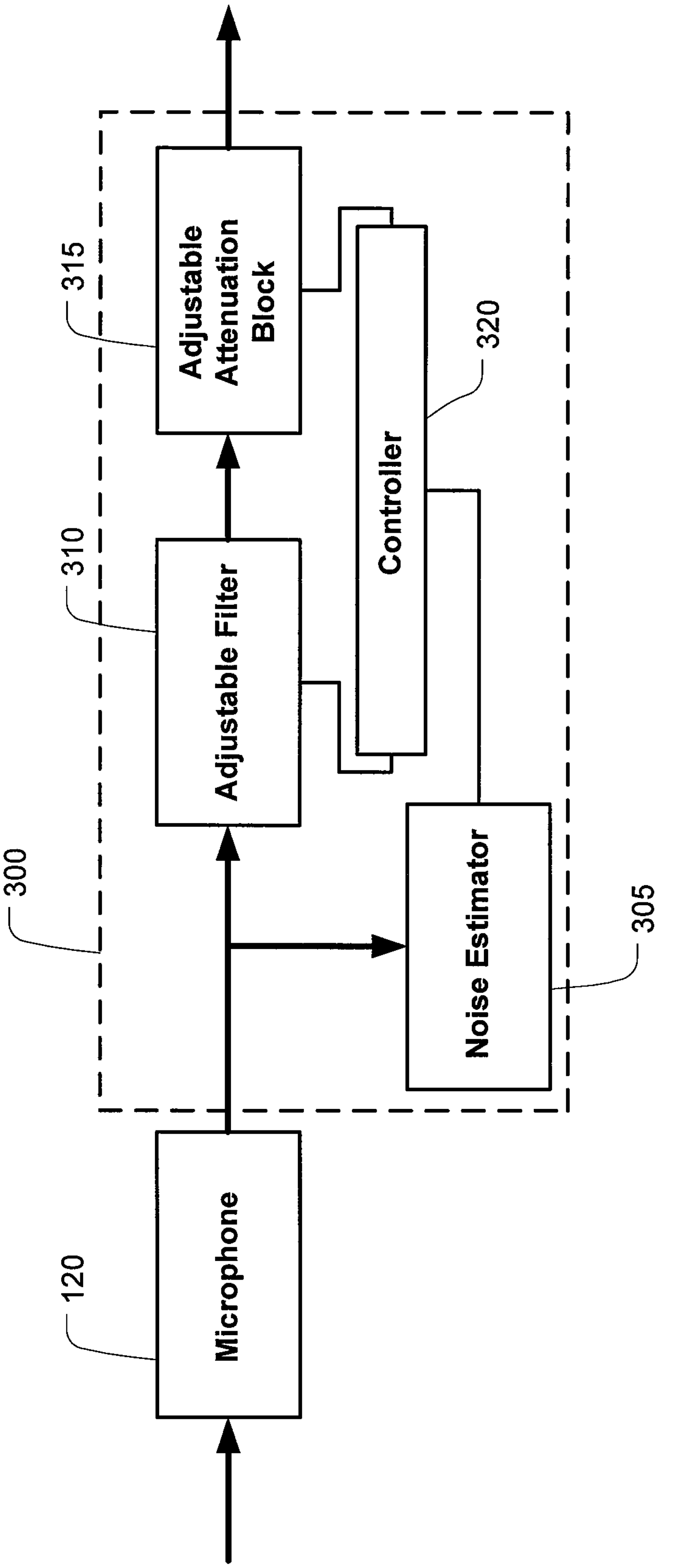
FIG. 4 is a functional block diagram of an exemplary embodiment of a system for reducing uplink noise.

FIG. 4 is a block diagram of an exemplary embodiment of a system for reducing uplink noise 300. The system 300 includes a noise estimator 305, an adjustable filter 310, an adjustable attenuation block 315, and a controller 320. The system 300 is provided between the microphone 120 of the mobile device 100 and further processing elements (not shown in FIG. 4) within the mobile device 100.

As shown in FIG. 4, a voice plus noise composite signal is received by the microphone 120 and the signal is passed to the adjustable filter 310 while also being sent to the noise estimator 305. The noise estimator 305 monitors the signal to create an estimate of the noise level in the environment of the microphone 120. An estimate of the noise from the noise estimator 305 is provided to the controller 320, which adjusts the adjustable filter 310 based on a predetermined function of the noise estimate provided The adjustable filter 310 is applied to the signal from the microphone and the filtered signal is sent to the adjustable attenuation block 315. The adjustable attenuation block 315 is also adjusted based on a predetermined function of the estimated noise level. The adjusted signal is then sent for further processing. It will be understood that the system 300 described herein may be a part of, for example the communication subsystem 104 of the mobile device 100 and the further processing may include the preparation of the signal for transmission or the like.

The noise estimator 305 may be any currently available or hereafter developed noise estimator. For example, known noise estimators monitor a signal, evaluate when there is a break in speech, and use an average of the sound level during these breaks in speech as an estimate of the background noise in the environment of the microphone and/or person speaking. In the current embodiment, the noise estimator monitors the signal from the microphone 120, however, it is also possible for the noise estimator to monitor noise levels in other ways, for example, through a separate microphone (not shown).

Figure 5:
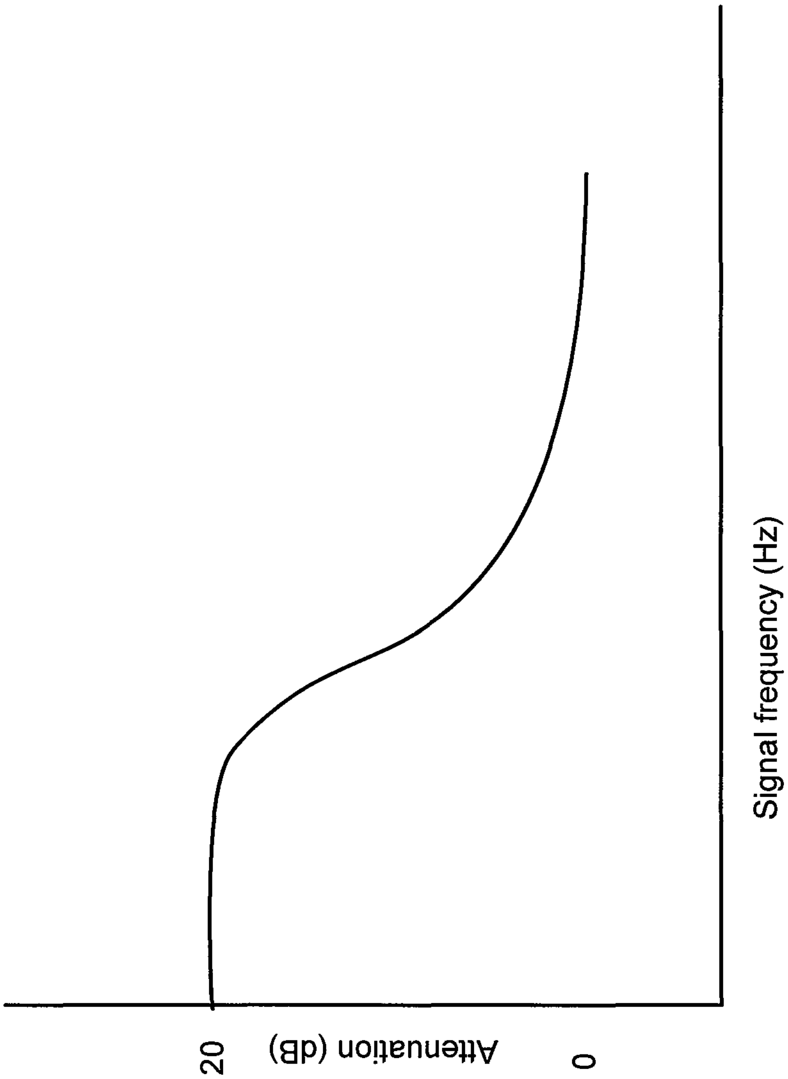
FIG. 5 is a graph illustrating an adjustable filter.

The adjustable filter 310 may also be a known or hereafter developed adjustable filter. In a particular case, the adjustable filter 310 is a high pass filter, which filters low frequency sounds from the signal. FIG. 5 shows an associated characteristic of an exemplary high pass shelf filter of a type that can be used in the system 300. As noted above, the adjustable filter 310 is adjusted by the controller 320 based on a predetermined function of the estimated noise level.

Figure 6:
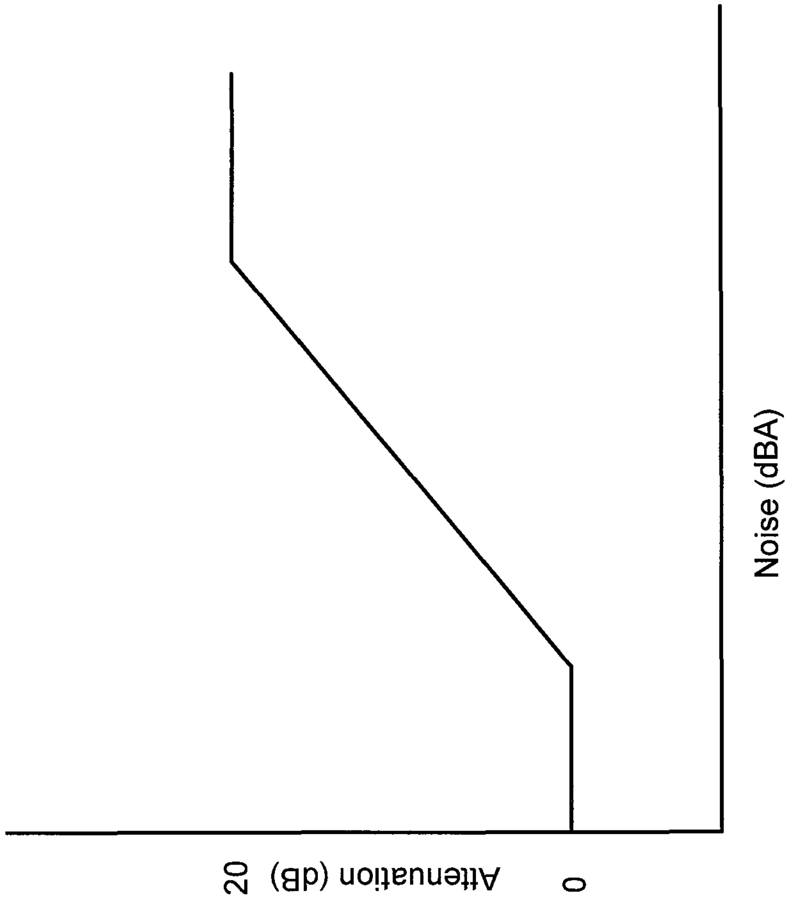
FIG. 6 is a graph illustrating the adjustment of the adjustable filter as a function of the estimated noise level.

FIG. 6 shows a simple straight-line function that can be used by the controller 320 to adjust the adjustable filter 310. Generally speaking, when the noise level is low no filtering will be applied to the signal. After reaching a first threshold, filtering will commence and gradually increase until a second threshold is reached, after which filtering will remain at a predetermined level.

For example, as shown in FIG. 5, the filter will allow higher frequencies to pass (0 dB attenuation) and attenuates lower frequencies at, for example, 20 dB. It will be understood that the controller 320 may also adjust the transition or cut-off frequencies of the adjustable filter 310 based on noise level. As such, at lower noise levels, the filtering may be applied at a lower frequency range and at a lower amplitude, while at higher noise levels, the filtering may cover a larger range of frequencies and be at a higher amplitude. When the controller 320 is controlling the adjustable filter 310 over a range, the simplest function is generally a straight-line function such that the filter amplitude is increased and low frequencies are gradually filtered out as the noise level increases. However, various other functions are also possible and the type of adjustable filter 320 used and the amplitude and frequencies filtered can be varied based on the type of noise in the environment.

In a particular case with regard to vehicle noise, which tends to be lower frequency noise, the use of an high pass adjustable filter to reduce the low frequency noise is understood to be surprisingly effective at increasing voice intelligibility on an uplink.

Figure 7:
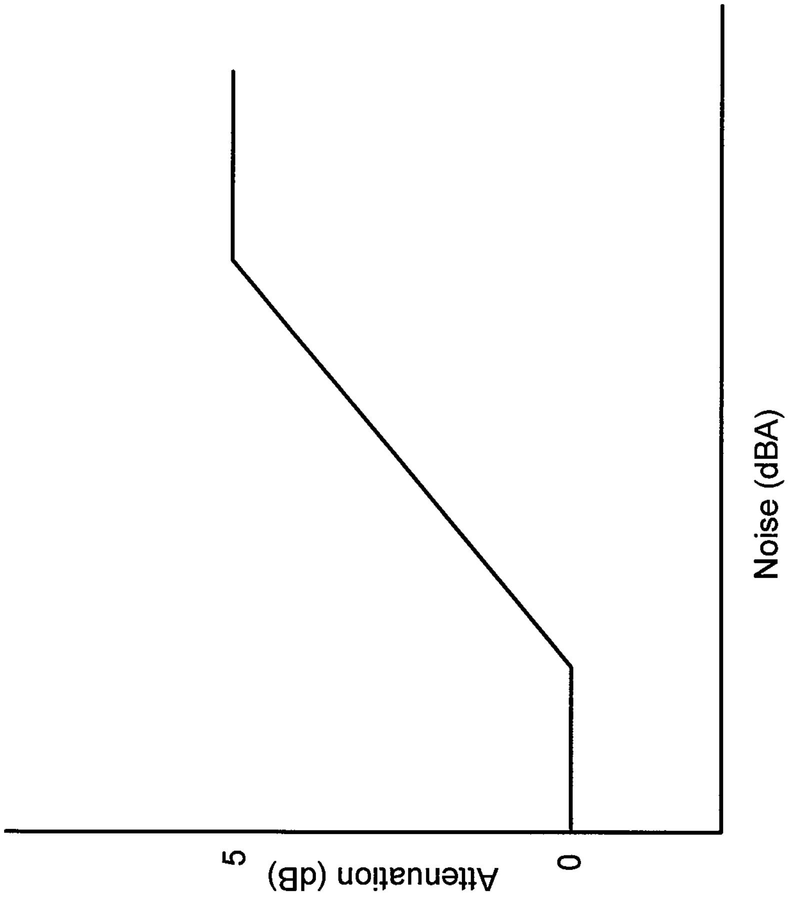
FIG. 7 is a graph illustrating the adjustment of the adjustable attenuation block as a function of the estimated noise level.

As with the adjustable filter 310, the adjustable attenuation block 315 may also be a conventional or hereafter developed component. The adjustable attenuation block 315 is provided so that the controller 320 can adjust the attenuation of the filtered signal based on a predetermined function of the noise level. The predetermined function used to adjust the adjustable attenuation block 315 may be the same as, similar to or different from the predetermined function used to adjust the adjustable filter 310. In conventional systems, a gain block is often used to increase/amplify the signal, however, contrary to what might otherwise be considered appropriate, in the present embodiment attenuation is actually increased as the noise level increases. Thus, in a lower noise environment, the attenuation is set to neutral. As the level of noise in the environment increases, the controller 320 adjusts the adjustable attenuation block 315 to adjust the attenuation higher in accordance with a predetermined function of the noise level and continues to increase the attenuation until a predetermined threshold is reached. FIG. 7 shows an exemplary simple straight-line function that can be used by controller 320 to adjust the attenuation based on the estimated noise level.

Although this exemplary embodiment focuses on filter and attenuation functions that include two thresholds and a linear (in log/dB domain) function for converting between estimated noise level (ENL) and filtering depth and attenuation, one of skill in the art will understand that there are various other functions or variations that can be used. For example, to provide a more complex function without overly increasing computational complexity, it is possible to consider a class of piece-wise linear functions. Continuous functions or piece-wise continuous functions may also be implemented. Further, it will be understood that the adjustable filter's "transition" frequency and/or cut-off frequency may also be adjusted as a function of ENL. Still further, other filter shapes may be used and/or varied based on ENL, for example, a pre-emphasis may be added to the adjustable filter 310 as a function of ENL.

The reason that the attenuation is increased as a function of increasing noise relates to a phenomenon known as the Lombard effect. The Lombard effect is the name of the phenomenon that a human speaker will typically raise the volume of his/her voice when in a noisy environment. An interesting aspect of this Lombard effect that is used to advantage in the exemplary embodiments herein is that the human speaker will often raise his/her voice higher relative to their normal speaking voice than the level that the noise is higher relative to a no-noise environment. As such, an increase in the attenuation of the signal containing both voice and noise tends to improve the clarity of the voice while lessening the effect of the noise.

Interestingly, experiments have shown that the system 300 of the exemplary embodiment having a combination of shelf filtering and increased attenuation in noisy environments has had a surprising effect on noise reduction.

Figure 9:
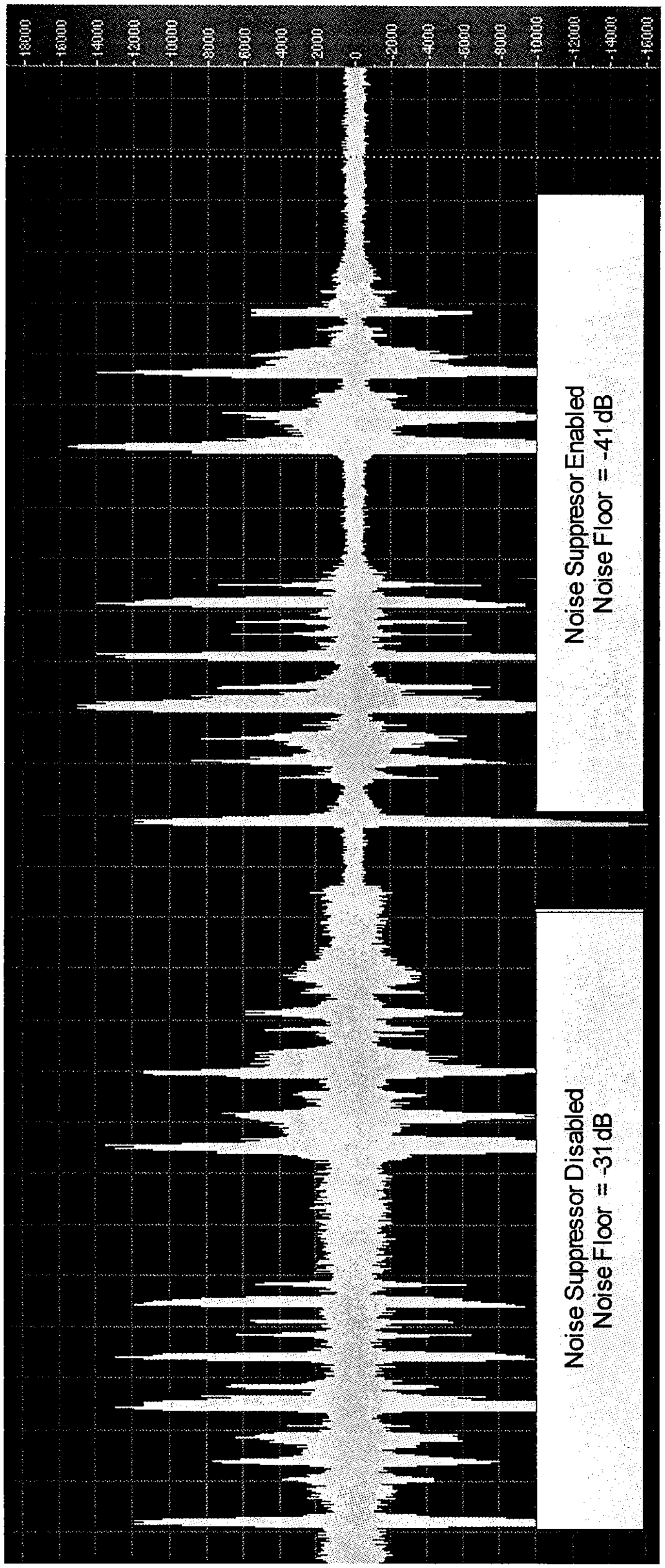
FIG. 9 is a screen showing a voice/noise signal both before and after use of embodiment of the system of FIG. 4.
Figure 10:
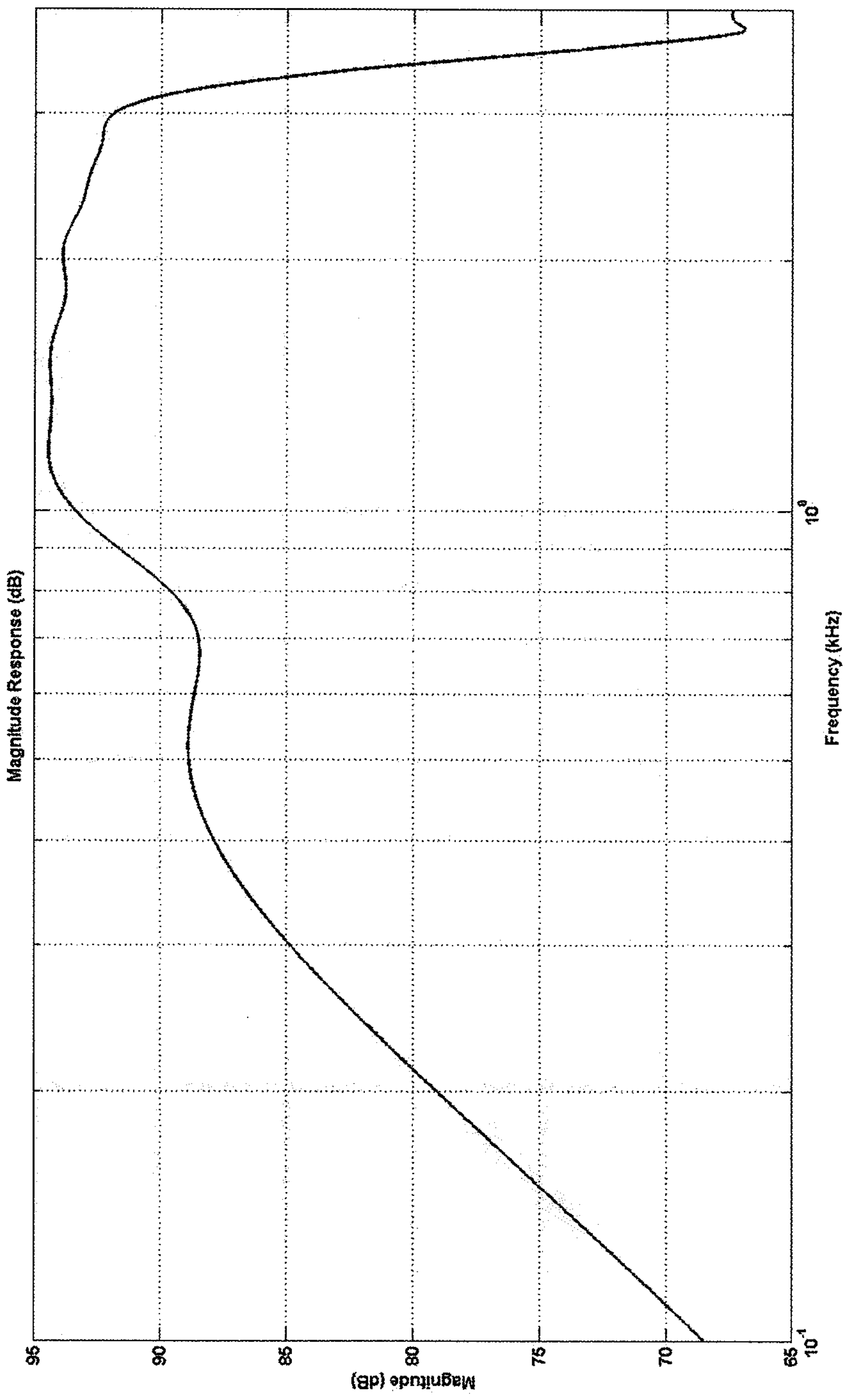
FIG. 10 is a graph showing the frequency response of a signal when an embodiment of the system of FIG. 4 is operating.

In an experiment conducted using an exemplary system 300 having the parameters shown in the table of FIG. 8, the system 300 was able to produce a noise reduction of approximately 10 dB in the noise floor of the signal, as shown in FIG. 9. FIG. 9 shows a voice signal and noise before and after application of the system 300. In this particular experiment, the adjustable filter 310 was a shelf filter with a cut-off frequency (Fc) of 1200 Hz, a min attenuation of 0 dB and max of 9 dB, and an offset of 62 dBA. The controller 320 controlled the adjustable filter 310 such that there was an increase in attenuation of 1.5 dB for each 1 dB increase in estimated noise level for all frequencies below Fc. In terms of frequency, the adjustable filter 310 was set to begin at the beginning of the voice band and end at Fc. Similarly, the adjustable attenuation block 315 was set to provide a min attenuation of 0 dB and a max of 3 dB, with an offset of 70 dB. The offset for the adjustable attenuation block 315 was higher than that for the adjustable filter 310 because the attenuation was applied to the whole band. The controller 320 controlled the adjustable attenuation block 315 such that there was an increase of attenuation of 0.5 dB for each 1 dB increase in estimated noise level. FIG. 10 shows a typical uplink frequency response with the system 300 enabled as in the experiment above.

Figure 11:
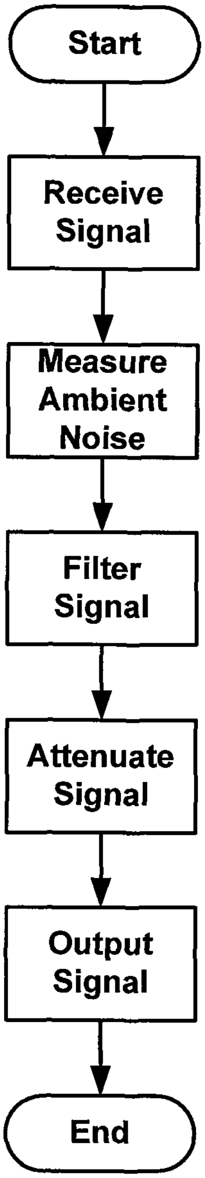
FIG. 11 is a flow chart of an exemplary embodiment of a method for reducing uplink noise.

FIG. 11 is a flowchart of an exemplary method for reducing uplink noise 1100 in a communication device. The method 1100 can generally be understood from the description of the system 300 above. However, FIG. 11 is provided for further clarity. The method 1100 begins when a signal is received (1110), for example, at a microphone of the communication device. At 1120, an ambient noise level in the environment of the communication device is detected. At 1130, the signal is filtered based on the detected noise level. At 1140, the signal is then attenuated based on the detected noise level. The signal is then transmitted by the communication device at 1150. It will be understood that this method is preferably performed in an adaptive manner such that the filtering and attenuation are performed approximately continuously throughout the duration of the signal to be transmitted.

It will be understood that the system 300 and method 1100 may be embodied in software, for example in a memory or on a computer readable medium, or hardware or some combination thereof. Similarly, the system 300 may be provided in and/or the method 1100 may be performed by the microprocessor 102 or the communication subsystem 104 of the mobile device 100 or by components thereof (for example, the communication subsystem 104 may already include an adjustable attenuation block that can be adapted accordingly). Further, the components of the system 300 may be analog components or digital components. In the case of digital components, it would be understood by one of skill in the art that there would generally be an analog to digital converter provided between an analog microphone and the system 300.

It should be understood that various modifications can be made to the exemplary embodiments described and illustrated herein, without departing from the general scope of the appended claims. In particular, it should be understood that while the embodiments have been described for mobile communication devices, the embodiments are generally applicable to communications devices that are used in noisy environments.

We claim:

1. A method for reducing uplink noise in a mobile device, the method comprising:

receiving an input signal at the mobile device, the input signal comprising a voice plus noise composite signal;

estimating a noise level in the vicinity of the mobile device based on the input signal;

filtering the input signal using shelf filtering based on the estimated noise level to produce a filtered input signal; and applying attenuation equally to the whole filtered input signal based on the estimated noise level, and increasing the equally applied attenuation for higher estimated noise levels.

2. The method of claim 1, wherein the filtering based on the estimated noise level comprises increasing a transition frequency of the shelf filtering for higher estimated noise levels.

3. The method of claim 1, wherein the filtering based on the estimated noise level comprises filtering according to a predetermined function.

4. The method of claim 3, wherein the filtering according to a predetermined function comprises, for frequencies below a transition frequency of the shelf filtering: (i) applying attenuation of 0 dB when the estimated noise level does not exceed a first threshold of estimated noise level, (ii) applying a predetermined attenuation when the estimated noise level exceeds a second threshold of estimated noise level, and (iii) applying attenuation that increases from 0 dB to the predetermined attenuation in relation to the estimated noise level, when the estimated noise level is between the first and second thresholds of estimated noise level.

5. The method claim 4, wherein the first threshold is approximately 62 dBA and the second threshold is approximately 71 dBA.

6. The method of claim 4, wherein the attenuation increases from 0 dB to the predetermined attenuation as at least one of: a linear function, piecewise linear function, continuous function or piecewise continuous function of the estimated noise level.

7. The method of claim 1, wherein the applying attenuation based on the estimated noise level comprises applying attenuation according to a predetermined function.

8. The method of claim 7, wherein the applying attenuation according to a predetermined function comprises: (i) applying attenuation of 0 dB when the estimated noise level does not exceed a first threshold of estimated noise level, (ii) applying a predetermined attenuation when the estimated noise level exceeds a second threshold of estimated noise level, and (iii) applying attenuation that increases from 0 dB to the predetermined attenuation in relation to the estimated noise level, when the estimated noise level is between the first and second thresholds of estimated noise level.

9. The method claim 8, wherein the first threshold is approximately 70 dBA and the second threshold is approximately 76 dBA.

10. The method of claim 8, wherein the attenuation increases from 0 dB to the predetermined attenuation as at least one of: a linear function, piecewise linear function, continuous function or piecewise continuous function of the estimated noise level.

11. A system for reducing uplink noise in a mobile device, the system comprising:
- a noise estimator for estimating a noise level in proximity to the mobile device based on an input signal comprising a voice plus noise composite signal;
- an adjustable filter comprising a shelf filter for receiving the input signal from a microphone of the mobile device and filtering the input signal to produce a filtered input signal;
- an adjustable attenuation block for receiving the filtered input signal from the adjustable filter and applying attenuation equally to the whole filtered input signal; and
- a controller configured to:
  - monitor the estimated noise level; and
  - adjust the adjustable filter and the adjustable attenuation block based on the estimated noise level, wherein the controller is configured to adjust the adjustable attenuation block by increasing the equally applied attenuation for higher estimated noise levels.

12. The system of claim 11, wherein the controller is configured to adjust each of the adjustable filter and the adjustable attenuation block based on a predetermined function of the estimated noise level.

13. The system of claim 12, wherein based on the predetermined function for the adjustable filter, the controller is configured to adjust, for frequencies below a transition frequency of the shelf filter, to: (i) apply attenuation of 0 dB when the estimated noise level does not exceed a first threshold of estimated noise, (ii) apply a predetermined attenuation when the estimated noise level exceeds a second threshold of estimated noise, and (iii) increase attenuation from 0 dB to the predetermined attenuation in relation to the estimated noise level, when the estimated noise level is between the first and second thresholds of estimated noise level.

14. The system of claim 13, wherein the first threshold is approximately 62 dBA and the second threshold is approximately 71 dBA.

15. The system of claim 13, wherein the controller is configured to increase attenuation from 0 dB to the predetermined attenuation as at least one of: a linear function, piecewise linear function, continuous function or piecewise continuous function of the estimated noise level.

16. The system of claim 12, wherein based on the predetermined function for the adjustable attenuation block, the controller is configured to adjust the adjustable attenuation block to: (i) apply attenuation of 0 dB when the estimated noise level does not exceed a first threshold of estimated noise level, (ii) apply a predetermined attenuation when the estimated noise level exceeds a second threshold of estimated noise level, and (iii) increase attenuation from 0 dB to the predetermined attenuation in relation to the estimated noise level, when the estimated noise level is between the first and second thresholds of estimated noise level.

17. The system of claim 16, wherein the first threshold is approximately 70 dBA and the second threshold is approximately 76 dBA.

18. The system of claim 16, wherein the controller is configured to increase attenuation from 0 dB to the predetermined attenuation as at least one of: a linear function, piecewise linear function, continuous function or piecewise continuous function of the estimated noise level.

19. The system of claim 11, wherein the controller is configured to adjust the adjustable filter by increasing a transition frequency of the shelf filter for higher estimated noise levels.

20. A non-transitory computer readable medium storing instructions that, when executed on a processor of a mobile device, cause the processor to:
- receive an input signal at the mobile device, the input signal comprising a voice plus noise composite signal;
- estimate a noise level in the vicinity of the mobile device based on the input signal;
- filter the input signal using shelf filtering based on the estimated noise level to produce a filtered input signal;
- apply attenuation equally to the whole filtered input signal based on the estimated noise level, and increase the equally applied attenuation for higher estimated noise levels; and
- transmit the attenuated, filtered signal.

* * * * *